(12) United States Patent
Liang et al.

(10) Patent No.: US 8,094,585 B2
(45) Date of Patent: Jan. 10, 2012

(54) MEMBERSHIP MANAGEMENT OF NETWORK NODES

(75) Inventors: Jin Liang, Sunnyvale, CA (US);
Michael Joseph Spreitzer, Croton-on-Hudson, NY (US);
Malgorzata Steinder, Fort Lee, NJ (US); Chunqiang Tang, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 1029 days.

(21) Appl. No.: 11/838,452

(22) Filed: Aug. 14, 2007

(65) Prior Publication Data

US 2008/0104218 A1   May 1, 2008

Related U.S. Application Data

(60) Provisional application No. 60/863,582, filed on Oct. 31, 2006.

(51) Int. Cl.
*H04L 12/44* (2006.01)

(52) U.S. Cl. ......... 370/256; 370/408; 709/223; 709/252

(58) Field of Classification Search ......... 370/254–256, 370/400, 401, 408; 709/220–223, 252
See application file for complete search history.

(56) References Cited

U.S. PATENT DOCUMENTS

| | | | | |
|---|---|---|---|---|
| 5,289,460 A | * | 2/1994 | Drake et al. | 370/245 |
| 5,355,371 A | * | 10/1994 | Auerbach et al. | 370/255 |
| 5,517,494 A | * | 5/1996 | Green | 370/408 |
| 5,831,975 A | * | 11/1998 | Chen et al. | 370/256 |
| 6,252,856 B1 | * | 6/2001 | Zhang | 370/254 |
| 6,947,434 B2 | * | 9/2005 | Hundscheidt et al. | 370/401 |
| 7,304,955 B2 | * | 12/2007 | Lee | 370/237 |
| 7,363,339 B2 | * | 4/2008 | Delany et al. | 709/202 |
| 2003/0026268 A1 | * | 2/2003 | Navas | 370/400 |
| 2003/0035380 A1 | * | 2/2003 | Downing et al. | 370/255 |
| 2004/0139150 A1 | * | 7/2004 | McCanne et al. | 709/202 |
| 2006/0268742 A1 | * | 11/2006 | Chu et al. | 370/254 |

OTHER PUBLICATIONS

G. Khanna et al., "Application Performance Management in Virtualized Server Environments," NOMS 2006, Apr. 2006, pp. 373-381.
X. Zhang et al., "CoolStreaming/DONet: A Data-Driven Overlay Network for Peer-to-Peer Live Media Streaming," In IEEE INFOCOM '05, 2005, 10 pages.
M. Jelasity et al., "Gossip-Based Aggregation in Large Dynamic Networks," ACM Transactions on Computer Systems, Aug. 2005, pp. 219-252, vol. 23, No. 3.
A. Demers et al., "Epidemic Algorithms for Replicated Database Maintenance," ACM PODC, 1987, pp. 1-12.
A-M. Kermarrec et al., "Probabilistic Reliable Dissemination in Large-Scale Systems," IEEE Transactions on Parallel and Distributed Systems, Feb. 2003, pp. 1-11, vol. 14, No. 2.

(Continued)

*Primary Examiner* — Hassan Phillips
*Assistant Examiner* — Duc Duong
(74) *Attorney, Agent, or Firm* — Preston J. Young; Ryan, Mason & Lewis, LLP

(57) ABSTRACT

Nodes of the network are organized into a tree structure having a plurality of vertices. Each vertex of the tree structure comprises a group having a plurality of nodes. Membership information is maintained at each node. The membership information for a given node comprises information about a group to which the given node belongs and child groups of the group to which the given node belongs in the tree structure. The steps are performed at least in part by a processor.

22 Claims, 9 Drawing Sheets

OTHER PUBLICATIONS

Y-H. Chu et al., "Early Experience with an Internet Broadcast System Based on Overlay Multicast," Proceedings of USENIX Annual Technical Conference, Jun. 2004, 17 pages.

J. Liang et al., "MON: On-Demand Overlays for Distributed System Management," WORLDS '05: Second Workshop on Real, Large Distributed Systems, 2005, pp. 13-18.

S. Banerjee et al., "Resilient Multicast Using Overlays," SIGMETRICS '03, Jun. 2003, 12 pages.

M.J. Freedman et al., "Non-Transitive Connectivity and DHTs," WORLDS '05: Second Workshop on Real, Large Distributed Systems, Dec. 2005, pp. 55-60.

P. Barham et al., "Xen and the Art of Virtualization," SOSP '03, Oct. 2003, 14 pages.

L. Peterson et al., "A Blueprint for Introducing Disruptive Technology into the Internet," 1st Workshop on Hot Topics in Networks (HotNets-1), Oct. 2002, 6 pages.

P. Yalagandula et al., "A Scalable Distributed Information Management System," SIGCOMM '04, Aug. 2004, 12 pages.

M. Kwon et al., "Topology-Aware Overlay Networks for Group Communication," NOSSDAV '02, May 2002, 10 pages.

C. Intanagonwiwat et al., "Directed Diffusion: A Scalable and Robust Communication Paradigm for Sensor Networks," MobiCom '00, 2000, pp. 1-15.

I. Stoica et al., "Chord: A Scalable Peer-to-Peer Lookup Service for Internet Applications," SIGCOMM '01, Aug. 2001, pp. 1-12.

A. Rowstron et al., "Pastry: Scalable, Decentralized Object Location and Routing for Large-Scale Peer-to-Peer Systems," In Middleware 2001, Nov. 2001, 22 pages.

M. Castro et al., "Performance and Dependability of Structured Peer-to-Peer Overlays," DSN '04, Jun. 2004, 10 pages.

A. Medina et al., "Brite: An Approach to Universal Topology Generation," MASCOTS '01, 2001, 8 pages.

* cited by examiner

MEMBERSHIP MANAGEMENT OF NETWORK NODES

CROSS-REFERENCE TO RELATED APPLICATIONS

This application claims the benefit of U.S. Provisional Application No. 60/863,582, filed Oct. 31, 2006.

FIELD OF THE INVENTION

The present invention relates to the management of networks and, more particularly, techniques for membership management of network nodes in a tree structure.

BACKGROUND OF THE INVENTION

Today's enterprise networks have evolved into complex systems that consist of thousands and even tens of thousands of computing nodes, storage bricks, and multi-tier software components. As a result, how to effectively manage such large scale infrastructure has become an important problem. Data aggregation, the process of computing aggregate information from distributed data sources, is a fundamental building block underlying many applications for managing enterprise networks. Traditionally, data aggregation has been implemented by unscalable schemes such as centralized servers. As enterprise networks continue to grow in size, designing scalable, distributed data aggregation mechanisms has become an urgent task.

In centralized aggregation schemes, a central aggregation point is responsible for directly contacting each node and aggregating data from the node. As a result, it has fairly high reliability, which means a node will be missing from the aggregation only if the aggregation point cannot communicate with it. In distributed aggregation, both aggregation request and partial aggregation data are relayed by intermediate nodes. As a result, the data from some nodes may be missing due to intermediate node failures, even if the missing nodes are live themselves.

Achieving high reliability in distributed aggregation, i.e., aggregating data from all nodes that are currently live is highly desirable for many applications such as distributed performance/security problem diagnostics. For example, suppose a new software update has been applied to a large number of machines, which subsequently caused some subtle performance problem that only occurs infrequently on a small number nodes. In diagnosing such problems, it would be extremely useful to query if a particular error message has been logged on any machine. In such cases, missing just a few nodes might mean the problem goes undetected, which could be costly.

The reliability of distributed aggregation can be affected by two kinds of failures: forward path failures that prevent the aggregation request from reaching some nodes; and return path failures that prevent partial aggregation result from reaching the aggregation point. Forward path failures are caused by latent node failures, which refer to nodes that have failed, but have not been detected by their neighbors (those nodes that may potentially send an aggregation request to them). Since no failure detector can detect failures infinitely fast, latent failures are inherent in any distributed environment. To address such failures, forward path redundancy is used to propagate aggregation request along redundant paths. Return path failures are caused by node failures that happen during the aggregation. Such failures can be addressed by techniques such as child failure bypassing.

Using redundant request propagation to combat latent failures may increase system overhead. Thus, any reliable aggregation system should attempt to minimize the message overhead while improving the aggregation reliability. It is clear that the performance of redundant request propagation depends strongly on how a node manages its membership information (i.e., which other nodes are known to a given node). Several membership management schemes analyze how they support forward path redundancy.

Much previous work, see, for example, G. Khanna et al., "Application Performance Management in Virtualized Server Environments," NOMS 2006, Vancouver, Canada, April 2006; X. Zhang et al., "DONet: A Data-Driven Overlay Network for Peer-to-Peer Live Media Streaming," In IEEE INFOCOM '05, Miami, Fla., 2005, and M. Jelasity et al., "Gossip-Based Aggregation in Large Dynamic Networks," ACM Transactions on Computer Systems 21, 3, August 2005, 219-252, has considered continuous aggregation where the aggregation functions are pre-installed, and the aggregate values are constantly updated.

Traditionally, aggregation is often associated with computing some aggregation functions such as COUNT, AVG and SUM. A more general view is provided in which aggregation means the process of executing an aggregation request on each node locally and returning the execution result in an aggregated form. The aggregation request can be any operation that is executed locally on each node (e.g., searching through a log file and returning a line that matches certain pattern). The aggregation is assumed to be reductive, i.e., the final aggregation result has a relatively small data size, which is independent of the system size. In the case of distributed log search, it is assumed that the aggregation request can specify aggregation functions such as "first K," "random K," etc., similar to the well known "top K" aggregation function for numeric values.

In a highly dynamic distributed environment, the reliability of distributed aggregation can be affected by two kinds of failures: forward path and return path failures.

Forward path failure means the aggregation request is sent to a dead node. Since this node cannot continue forwarding the request, it may cause some live nodes to not receive the request, and thus, be missing from the aggregation result. For example, suppose node D in FIG. 1 has failed but has not been detected by node A (i.e., it is a latent failure), when it receives an aggregation request, it will not forward it to other nodes. This may cause nodes C, F and G to be missing from the aggregation result, even if they are alive.

Latent failures are inherent in any distributed system. This is because no failure detector can detect failures infinitely fast in a distributed environment. One way to address latent failures might be to improve failure detection time. For example, to send heartbeat messages at a fast rate. However, this is problematic since it not only increases the system overhead, but also risks high false positive, i.e., declaring a node as failed when it is just a little slow. As a result, it is desirable to design a solution that can tolerate latent failures and achieve high reliability, rather than try to eliminate latent failures.

Return path failure refers to node failures that happen during the aggregation. This may prevent partial aggregation data from reaching the aggregation point. For example, suppose node D in FIG. 1 fails after it has propagated the aggregation request to C, F and G, but before it sends partial aggregation data back to A, the data from C, F and G might be lost, even if these nodes are live.

As alluded to in FIG. 1, a tree structure is well-suited for distributed data aggregation. Each interior node in the tree can compute the partial aggregation result for its subtree, and return the partial result to its parent. Therefore, the most straightforward way for distributed data aggregation is to maintain a tree structure. Whenever an aggregation request is issued, it is propagated down the tree, and the results are returned along the reverse tree edges.

Using a fixed aggregation tree, however, may suffer from the latent failure problem discussed earlier. To overcome latent failures, redundant request propagation may be used. This means the aggregation request is propagated along multiple redundant paths to each node. As a result, if some of the paths are broken due to latent failures, the node can still receive the aggregation request from other paths. If a node receives redundant requests from multiple senders, it chooses only one of them as a parent (e.g., the first one from whom the request is received) and sends its partial aggregation data to the parent. For other senders, it can send a "prune" message back so that the sender will not wait for data from this node.

When an aggregation request is propagated redundantly and each node chooses a parent only after an aggregation request is received, an aggregation tree that is dynamically discovered is actually used. Therefore, an aggregation system can be separated into two layers, the lower layer that manages membership information about peer nodes, and the upper layer that utilizes such information for request propagation and result aggregation. Such an architecture is shown in FIG. 2. It is clear how the upper layer can utilize forward path redundancy depends on how the lower layer manages membership information about other nodes in the system.

A special case for the membership management is just to maintain a tree structure. Each node knows about its parent and children. Such a membership layer does not provide any redundancy. The aggregation layer can only propagate the request along the tree edges. Thus, the aggregation tree is the same as the membership tree. When there are no failures in the system, such a membership scheme can achieve perfect reliability. However, when there are latent failures, the reliability will be affected.

Gossip protocols, (See, for example, A Demers et al., "Epidemic Algorithms for Replicated Database Maintenance," ACM PODC, 1987) have recently been used for membership management in many systems (See, for example, A. Kermarrec et al., "Probabilistic Reliable Dissemination in Large-Scale Systems," IEEE Transactions on Parallel and Distributed Systems 14, 3, March 2003; Y. Chu et al., "Early Experience with an Internet Broadcast System Based on Overlay Multicast," Proceedings of USENIX Annual Technical Conference, Boston, Mass., June 2004; X. Zhang et al., "DONet: A Data-Driven Overlay Network for Peer-to-Peer Live Media Streaming," In IEEE INFOCOM '05, Miami, Fla., 2005; and L. LIANG et al., "MON: On-demand Overlays for Distributed System Management," WORLDS '05, 2005). The basic idea is that each node maintains information about a random subset of other nodes in the system (called a local view), and each node periodically exchanges such membership information with random members in order to keep the local view up-to-date.

Gossip based membership provides high degree of redundancy. The aggregation layer can propagate the request to any node in the local view. However, since the membership overlay formed by the local view is unstructured, high reliability can only be achieved if each node propagates the request to all (i.e., flooding) or a large number (See, for example, A. Kermarrec et al., "Probabilistic Reliable Dissemination in Large-Scale Systems," IEEE Transaction on Parallel and Dist. Systems 14, 2, February 2003) of nodes in the local view, even when the system has no failures, which is undesirable. Another drawback of gossip based membership management is that each node only gossips with random members. Thus, it is difficult to tell if some members in the local view have failed.

Since a tree based membership lacks redundancy, and a gossip based membership lacks structure, a simple solution is to maintain both a tree and a random local view in the membership layer. When the aggregation request is received (at the aggregation layer), it is propagated along both the tree edges and some random edges. This may result in good reliability even with small degree of redundancy. Previous work (see, for example S. Banerjee et al. "Resilient Multicast Using Overlays," Sigmetrics '03, June 2003) has explored similar idea for resilient multicast.

Our goal is to achieve high reliability for such on-demand aggregation in highly dynamic enterprise environment. High reliability means that the aggregate data should be computed from all live nodes currently in the system, despite the possible node failures that happen before or during the aggregation process.

SUMMARY OF THE INVENTION

In accordance with the aforementioned and other objectives, the embodiments of the present invention are directed towards methods and apparatus that manage membership of a network of nodes through the use of a tree structure.

For example, in one aspect of the present invention, techniques for managing membership of a network of nodes are provided. Nodes of the network are organized into a tree structure having a plurality of vertices. Each vertex of the tree structure comprises a group having a plurality of nodes. Membership information is maintained at each node. The membership information for a given node comprises information about a group to which the given node belongs and child groups of the group to which the given node belongs in the tree structure. The steps are performed at least in part by a processor.

In additional embodiments of the present invention, node failures may be detected. A message may be sent periodically from each node to a neighbor of each node for failure detection. If the given node is unresponsive to a defined number of messages, a node failure may be reported to other nodes in the group to which the given node belongs. Further, membership information may be maintained at each node by exchanging membership information with other nodes.

In further embodiments of the present invention, data aggregation may be performed on the network of nodes. A plurality of nodes in a root group of the tree structure may be randomly selected. An aggregation request may be propagated to the plurality of nodes. A random node in each child group of the root group may be selected by each of the plurality of nodes. The aggregation request may be propagated to the random nodes in each child group. The aggregation request may also be propagated to each node in the root group from each of the plurality of nodes. The random nodes in each child group then repeat the process as if they were the plurality of original nodes in a root group, each selecting a random node in each child group of their group, and propagating the aggregation request to the random nodes and each node in their group.

In summary, the embodiments of the present invention address issues (i.e., forward and return path failures) in achieving highly reliable distributed aggregation, and design different techniques to address such issues. The embodiments of the present invention further address design of a membership overlay called group tree, which provides both redundancy and structure for membership management. Such redundancy and structure allow highly reliable distributed aggregation to be built in an efficient manner.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

Figure 1:
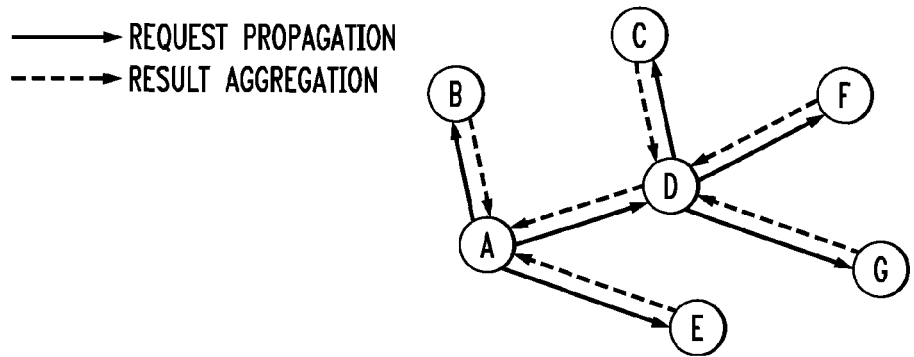
FIG. 1 is a diagram illustrating distributed aggregation, according to an embodiment of the present invention.
Figure 2:
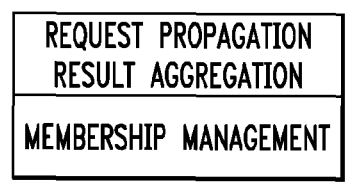
FIG. 2 is a table illustrating a two layer architecture for reliable distributed aggregation, according to an embodiment of the present invention.

Reliable data aggregation, the ability to compute aggregate information from all live nodes in a distributed system is a fundamental building for many enterprise management systems. A group tree organizes nodes of a distributed system into a rough tree structure. Each tree vertex consists of a group of nodes that provide natural redundancy for each other. The membership redundancy within a group and the tree structure across groups achieves high, reliability even with moderate message redundancy. SAHRA, a Scalable and Highly Reliable Aggregation system has been built on top of group tree. Through extensive simulation and PlanetLab experiments, SAHRA is shown to achieve high reliability.

A system with N nodes that are connected with high speed and low latency network is provided. Each node can directly communicate with any other node. However, messages can be lost or take arbitrarily long time for delivery. Assuming arbitrary message delivery time might seem contradictory to the enterprise environment. However, this is realistic since message delivery time depends not only on network delay, but also on process responsiveness, which could be very slow when the node is overloaded. As a result, the asynchronous distributed computing model is adopted (See, for example, G. Tel, "Introduction to Distributed Algorithms," 2 ed. Cambridge University Press, September 2000), which does not make any assumption about the timing information in a distributed system.

Although timing assumptions about the distributed environment are not made, an enterprise environment does facilitate the solution in two ways. First, the locality awareness of nodes in the current solution is not considered since all nodes are equivalent in terms of geographical locality. Second, complex network failures such as non-transitive connectivity are not considered (See, for example, M. Freedman et al., "Non-transitive Connectivity and DHTs," USENIX WORLDS '05, December 2005) that could occur in a wide area environment.

A crash-stop failure model is assumed. At any time, each node may be either live or dead. Live nodes may become dead and thus, leave the system, and a dead node can become live and re-join the system. A dead node cannot respond to any messages.

It is assumed that the enterprise network is highly dynamic. Nodes can join and leave the system fairly quickly. Although an enterprise network is presumably more stable than an end host based peer-to-peer system, relatively high churn rate is considered for three reasons. First, an enterprise network does have all kinds of failures that are caused by a variety of reasons such as hardware failures, software crashes, misconfigurations and operator errors. Second, using virtual machines (See, for example, P. Barham et al., "Xen and the Art of Virtualization," SOSP '03, October 2003) for resource management (See, for example G. Khanna et al, "Application Performance Management in Virtualized Server Environments," NOMS 2006, Vancouver, Canada, April 2006) has gained increasing popularity in enterprise environment. Virtual machines facilitate resource management because they can be dynamically suspended, migrated and resumed. This, however, means there will be more dynamism if aggregating data across virtual machines. Third, reliable aggregation is especially useful when a system is in an extreme situation (e.g., when a configuration problem has caused large number of node crashes). Therefore, it is desirable to design for the worst case rather than the normal scenario.

Figure 3:
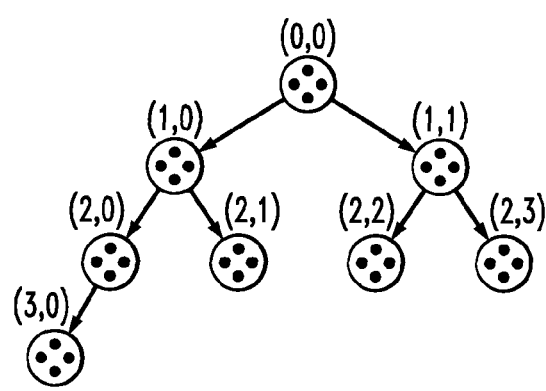
FIG. 3 is a diagram illustrating a group tree, according to an embodiment of the present invention.

The need for both redundancy and structure has motivated us to design a loosely structured overlay called group tree for membership management. As is shown in FIG. 3, a group tree organizes nodes into a rough tree structure, where each "tree vertex" is a group of nodes. Each node maintains full membership information about its own group and the child groups. In order to maintain high quality membership information, group tree uses several techniques for membership management, including heartbeat based failure detection, failure notification and gossip style membership exchange. As a result, it can not only detect failures quickly, but also share such information with each other.

Figure 4:
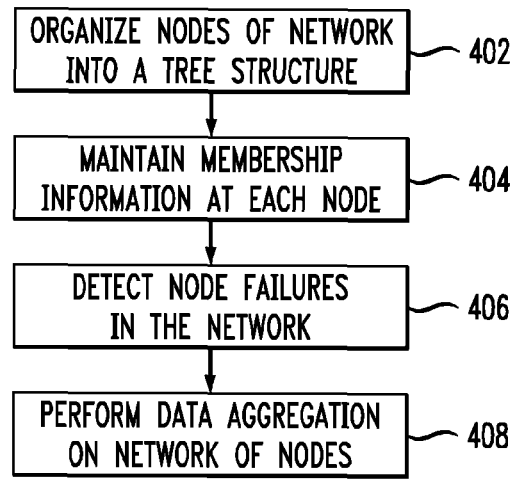
FIG. 4 is a flow diagram illustrating a membership management methodology for a network of nodes, according to an embodiment of the present invention.

Referring now to FIG. 4, a flow diagram illustrates a membership management methodology for network nodes, according to an embodiment of the present invention. The methodology begins in block 402 where nodes of the network are organized into a tree structure having a plurality of vertices. Each vertex of the tree structure is a group having a plurality of nodes. In block 404, membership information is maintained at each node. The membership information for a given node includes information about a group to which the given node belongs and child groups of the group to which the given node belongs in the tree structure. In block 406, failures of nodes in the network are detected. In block 408, data aggregation is performed on the network of nodes.

Since group tree has a rough tree structure, high reliability can be achieved by two steps: (1) propagating the aggregation request to each group; and (2) propagating the request to each node in the group. Since each node maintains full information about its group members and the child group members, any degree of redundancy can be easily added to both steps.

Forward path redundancy attempts to propagate the aggregation request to all live nodes. However, even if the request reaches every live node, the aggregation reliability may still be poor, due to return path failures. For example, a node may fail after it has received some partial results from its children, but before it forwards the data back to its parent. When the aggregation is finished in a short time, the probability of having return path failures is small. However, when the aggregation takes a long time (e.g., due to large network delay or searching through large log files), there is non-trivial probability for a return path failure.

Return path failure is handled using a simple technique called child failure bypassing. The idea is that when each node receives the aggregation request and propagates it to the children, it reports the list of children to its parent. Later, if the parent discovers that the node has failed, it will directly contact the grandchildren to obtain data from them. This simple approach only handles one level of return path failure. If both a node and one of its children fail during the aggregation, its parent will not be able to completely recover the data. However, such event should be extremely rare.

A group tree is a loosely structured membership overlay. As is shown in FIG. 3, a group tree consists of a "tree of groups." Each group has a group id in the form of (l, s). l is the level of the group. The root group has a level 0, and the level of a non-root group is 1 plus the level of the parent group, s is the "sequence" of the group within the same level, counting from left to right. Having such a group naming scheme allows node to compute the group id for its ancestor groups. For example, if a node is in group (l, s) and the group fanout is K, its parent group would be (l−1, s/K), etc. This is useful when repairing "group failures" (i.e., complete failure of a whole group).

The size of each group (denoted by n) is kept close to a small constant called the target size (which is 16 in the implementation). Each node maintains full membership information about its group, and the child groups.

When a node joins the system, it should know about some (possibly more than one) nodes already in the system. The information can be obtained via out-of-band means. The joining node sends parallel (at most 5) join request to its known nodes. Each node that receives the join request will check its group size. If it is smaller than the target size, an accept message is sent back. Otherwise, some child group members are sent back, so that the joining node can try to join the child groups. If an accept message is received, the joining node will join the corresponding group, which means it will assume the group id for the group, and begin to heartbeat and gossip with members in the group. When a node fails, it just stops responding to any message. Other nodes will eventually timeout and remove information about the failed node.

Each node has a random node id. Within each group, the nodes are organized into a ring according to their node ids. Each node has a right neighbor, which is the node that has the next larger node id in the group, or the one with the minimum node id if the current node has the largest id in the group. Each node X periodically heartbeats with its right neighbor Y for failure detection. If the right neighbor Y has been unresponsive for c (c is called the life count) consecutive heartbeat cycles, X considers Y to be dead and directly sends a failure notification message to all the other nodes in the group.

Failure notification is unreliable. This means the notification message may not reach every node in the group, e.g., due to message loss or imperfect membership view that the detecting node has. This does not create a problem, since each node has a timeout mechanism for each membership entry. If a node has failed, eventually its information will be removed from every node in the system.

In the group tree, each node maintains an "age" for every other node in its membership view. The age estimates the liveness of a node. For example, if node A has a membership entry for node B with an age of 3, node A knows that B is alive 3 seconds ago. Such information may not be directly obtained from B. For example, node C may have received a message from B 3 seconds ago. Thus, it knows for sure that B was alive at that time. Later C may gossip this information to A, so A may have an estimate for B's liveness, even if the two nodes have not directly communicated with each other.

In addition to failure detection, nodes periodically exchange membership information with each other. Such exchange allows nodes to learn about newly joined nodes, and to update liveness estimate (i.e., the age) for existing membership entries. There are three kinds of membership exchange messages. First, when a node heartbeats with its right neighbor, it will piggyback some membership information in the message. Second, a node will periodically select a random member in its group for membership exchange, in a way similar to the gossip protocol. Third, a node will also periodically select a random child member in a child group and exchange membership information with it.

Each group needs to keep the group size n close to the target size. Due to failures and node joins, the size of a group is allowed to vary between certain range. If a node finds its group size to be too small (less than half of the target size), it will "recruit" some nodes from a child group. Conversely, if a node finds its group size to be too large (more than half larger than the target size), it will migrate down to a child group with some probability. The probability is chosen to avoid the case where a large fraction of nodes in a group migrate down simultaneously.

Since each group consists of multiple nodes, it is very unlikely that all the nodes within a group may fail simultaneously. However, in the case a group fails at the same time, the failure can be repaired using a "bridging" technique. Specifically, when a node A detects a parent group failure (using the time-out mechanism), it will walk down its ancestor groups, starting from the root group. Each node maintains some membership entries for the root group, which is exchanged in the gossip message between parent and child groups. This means for each ancestor group g, Node A will probe some members in g, and in turn obtain some child members of g, which are still ancestors of A. When node A locates the first ancestor group g' for which it cannot find a live member, it joins the group and notifies the parent group of g'. If g' was the previous parent group of A, A also notifies its previous group members. As a result, the parent group is repaired and populated again. This technique can handle non-root group failures. It is the assumption that a root group never completely fails. If the root group fails, the network will be partitioned, which can only be repaired using additional mechanisms such as an underlying gossip protocol.

Some simple analysis of the membership quality and overhead for a group tree is provided. Within a group, heartbeats are used for failure detection. Suppose the heartbeat period is l seconds, and wait for c consecutive rounds before declaring a failure, the expected failure detection time is $$t \cdot \left(c + \frac{1}{2}\right).$$

Figure 5:
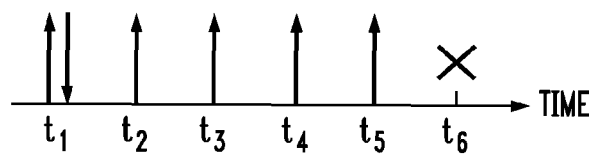
FIG. 5 is a diagram illustrating failure detection time, according to an embodiment of the present invention.

This is illustrated in FIG. 5. Suppose $t_1$ is the time when the last acknowledged heartbeat message was sent. Suppose c=4. At time $t_6$, it will be concluded that c consecutive messages have been unacknowledged, thus, the corresponding node must have failed. Since the node might have failed anywhere between $l_1$ and $t_2$, the expected detection time is $$c + z\frac{1}{2}$$

cycles.

Suppose the average life time of a node is L seconds, and after the node fails, it remains undetected for $$t \cdot \left(c + \frac{1}{2}\right)$$

seconds. Thus, if a random group member is examined, the probability that it has failed is $$t \cdot \left(c + \frac{1}{2}\right) / L.$$

This is called the "error rate" for group membership.

Every t seconds, a node will heartbeat with its right neighbor, gossip with a random group member and a random child member. As a result, the expected per node message overhead is $$\frac{6}{t}.$$

Every L seconds, there will be n·n failure notification messages. Therefore, the per node message overhead for failure notification is Z.

Our group tree protocol is designed for enterprise networks. Thus, currently it does not address wide area issues such as locality awareness and non-transitive network connectivity (See, for example, M. Freedman et al., "Non-transitive Connectivity and DHTs," USENIX WORLDS '05, December 2005). It turns out that locality awareness can be easily built into the group tree protocol. The group tree protocol does not restrict which nodes must be in which group. Therefore, each node can join or migrate to the group that consists of geographically nearby nodes. This way, the maintenance traffic may be reduced over the wide area network, and improve the locality awareness of the dynamically discovered aggregation tree.

The group tree protocol assumes nodes can directly communicate with each other. In a wide area environment, this may not be true. For example, for two nodes within a group, it is possible that both nodes are live, but they cannot communicate with each other. If they happen to be adjacent on the ring, one will declare the other as failed and incorrectly notify other group members. This can be addressed using different techniques. For example, the detecting node can ask some other random group member to confirm if the right neighbor has indeed failed. Further discussion of this problem, however, is out of the scope of this paper.

The tree structure and redundant membership information provided by a group tree makes it easier to achieve high reliability in distributed aggregation.

Suppose a message redundancy of r is specified, in the basic request propagation approach, the request initiator will randomly select r members in the root group, and propagate the request to them. Each selected member (called a "contact point" for its group) does the following: (1) it selects one random member in each child group (which becomes a contact point in its group) and propagate the request to it; (2) it propagates the request to each member in its own group. Since each node maintains full membership of its group, and the group size is relatively small, the second step can be achieved relatively easily. The simplest way implemented is for each contact point to directly send the aggregation request to each of its group members. In comparison, the first step is more important, since if the request is not propagated from a parent group to a child group, a "subtree" of the nodes will be missing from the aggregation.

When a redundancy of r is specified, each group is expected to have r contact points. Alternatively, it is expected that there are r messages from a parent group to each of its child group. However, in the simple propagation scheme described above, the redundancy may decrease from level to level. There are two causes for the redundancy decrease. First, a parent contact point may select a child contact point that has failed. Second, since different parent contact points select child contact points randomly and independently, it is possible that they select the same child contact points. This is called a conflict in child contact point selection. Since the group size is not large, such conflict can occur fairly often.

Suppose there are r parent contact points, and the child group has n members. If each parent contact point independently selects one child member as contact point, in expectation how many unique child members will be selected? This may be computed as follows. Define an indicator random variable $X_i$ to be either 1 or 0, meaning child member i is selected by at least one parent contact point or not. Clearly $$P[X_i = 1] = 1 - P[X_i = 0] = 1 - \left(1 - \frac{1}{n}\right)^r.$$

Therefore, the expected number of unique child contact points is $$E\left[\sum_{i=1}^{n} X_i\right] = \sum_{i=1}^{n} E[X_i] = n \cdot \left(1 - \left(1 - \frac{1}{n}\right)^r\right)$$

Suppose n=16 and r=5, after one level of propagation, the degree of redundancy is expected to decrease from 5 to about 4.4, which is more than 10% decrease. Since each selected child contact point may be a latent failure, the real redundancy will further decrease.

To avoid conflict in child contact point selection, each parent contact point can divide the child members into segments based on their ids, and select only one child member from one segment. The segment is chosen based on the "rank" of the parent contact point in its group. Basically, the rank of a node is the number of members in its group that have a smaller node id. This way it is unlikely that different parent contact points will select the same child member.

To reduce the probability of selecting a child member that has failed, the age information for the child membership entries is utilized. Suppose the life time of a node follows exponential distribution with a mean of L, and the age of a child member is $\tau$, then the probability that the child has failed during the $\tau$ seconds is $$1 - e^{\frac{-\tau}{L}}.$$

Clearly the smaller the $\tau$, the more likely the child is still alive. As a result, each parent contact point will select the child member with the smallest age in its segment as the child contact point.

Figure 6:
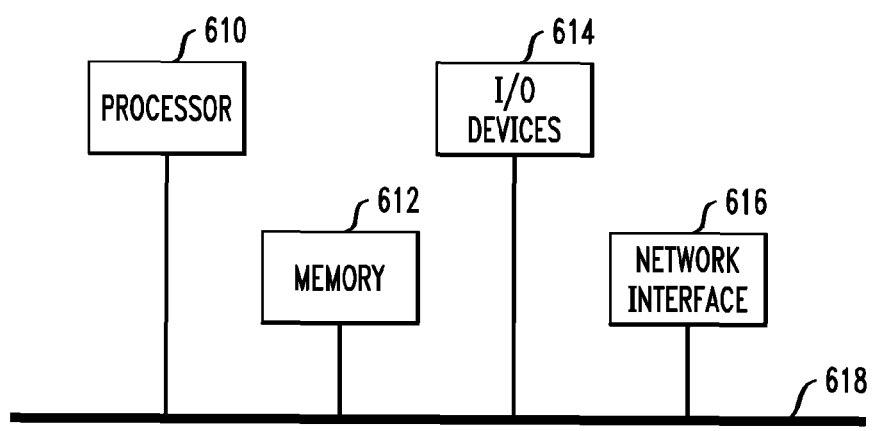
FIG. 6 is a block diagram illustrating an exemplary hardware implementation of a computing system in accordance with which one or more components/methodologies of the invention may be implemented, according to an embodiment of the present invention.

Referring now to FIG. 6, a block diagram illustrates an exemplary hardware implementation of a computing system in accordance with which one or more components/methodologies of the invention (e.g., components/methodologies described in the context of FIGS. 1-5) may be implemented, according to an embodiment of the present invention.

As shown, the computer system may be implemented in accordance with a processor 610, a memory 612, I/O devices 614, and a network interface 616, coupled via a computer bus 618 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

Still further, the phrase "network interface" as used herein is intended to include, for example, one or more transceivers to permit the computer system to communicate with another computer system via an appropriate communications protocol.

Software components including instructions or code for performing the methodologies described herein may be stored in one or more of the associated memory devices (e.g., ROM, fixed or removable memory) and, when ready to be utilized, loaded in part or in whole (e.g., into RAM) and executed by a CPU.

The SAHRA aggregation system has been completely implemented, including the group tree and reliable aggregation on top of it. The implementation is based on a single-thread, event-driven framework. Thus, the same code can run in both simulation and real world mode with minimal configuration change. In simulation mode, network packets are delivered as events. In real world mode, they are delivered using UDP sockets.

Figure 7:
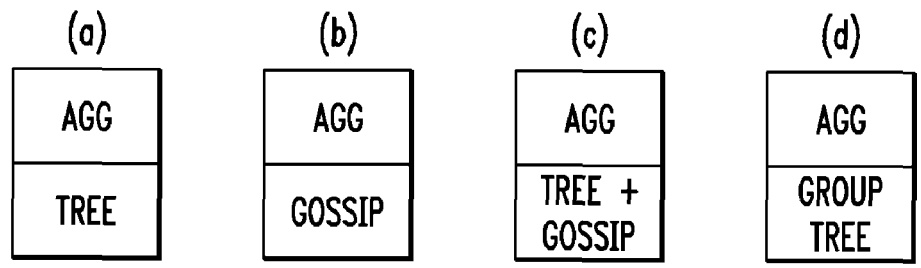
FIG. 7 is a diagram illustrating different aggregation schemes, according to an embodiment of the present invention.

Several alternative distributed aggregation schemes have been implemented for comparison. As is shown in FIG. 7, the difference between the schemes mainly lies in how the membership information is managed. The first scheme uses a maintained tree as the membership. As a result, there is no forward path redundancy. The second scheme uses gossip protocol for membership management. The aggregation tree is discovered by propagating the request to random nodes. The third scheme uses both a maintained tree and a random local view (maintained by gossip protocol) as its membership layer, and the aggregation request is propagated to along the tree edges and some random edges.

Each node periodically (every t' seconds) heartbeats with its children nodes. If a node does not receive a heartbeat from its parent from c consecutive rounds, it assumes the parent has died and therefore, it tries to re-join the system. What it does is to send a probe message to m random nodes, and joins the first node that responds with an acknowledge message. In the experiments, t'=1 second, c=4, and m=10. The fanout of a tree node is limited to 16. For schemes (b) and (c), each node maintains 30 membership entries in its local view, and gossips every 5 seconds. Scheme (c) is called "Tree+RF" since the aggregation layer propagates the request using both tree edges and random forwarding.

In the experiments, the following parameters for group tree are used. The target group size is 16, the group fanout is K=4. The heartbeat and gossip period is t=5 seconds, and the life count is c=4.

For all the simulation experiments, a network model generated by the BRITE topology generator is used. The network model has 10000 nodes. Each time a random subset of N nodes is selected as the system nodes. Unless mentioned otherwise, N is 1024 and the end-to-end delay between the nodes are normalized so that the average and maximum delay is about 17 ms and 60 ms, respectively.

Our evaluation focuses on two reliability metrics. The first is the average coverage of an aggregation, which means the expected percentage of live nodes that are covered/included in the aggregation. To emphasize on the ability to avoid missing live nodes (i.e., achieving high reliability), the total number of live nodes missed in 1000 aggregations is also compared. For both metrics, "live nodes" means the set of nodes that are live throughout the aggregation.

Aggregation under churn is mainly experimented with. This means each node in the system alternates between live and dead states. The duration for each state is exponentially distributed with a given mean, which is referred to as the "life time" and "death time," respectively. Since life time and death time are always chosen to be equal, life time is only mentioned in this section. For each experiment, the system is started and churn is introduced. Thereafter, 1000 aggregations are run, one in every 20 seconds, and the coverage and reliability metrics are computed.

Figure 8:
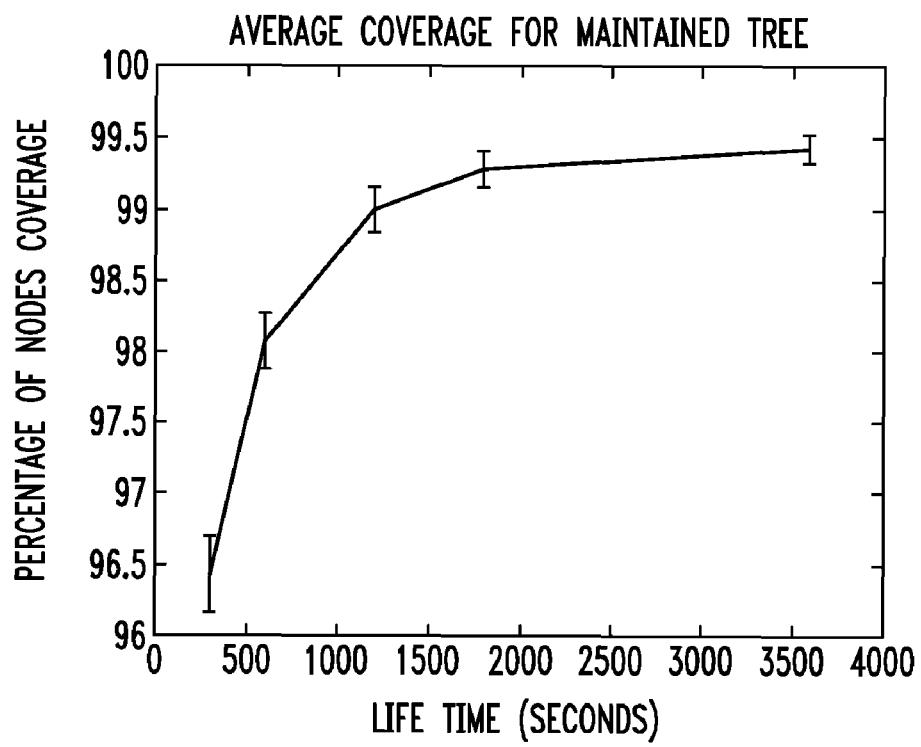
FIG. 8 is a graph illustrating average coverage and 95% confidence interval for aggregation on maintained free, according to an embodiment of the present invention.

The reliability of aggregation is first examined using maintained tree and gossip protocol, respectively. FIG. 8 shows the average coverage and 95% confidence interval of aggregation on maintained tree. The x-axis is the average life time. The smaller the life time, the higher the churn rate. FIG. 8 shows that when the average life time is 300 seconds, on average only 96.5% of the live nodes are covered. When life time is $\geq 1800$ seconds, more than 99% of the live nodes can be covered.

Figure 9:
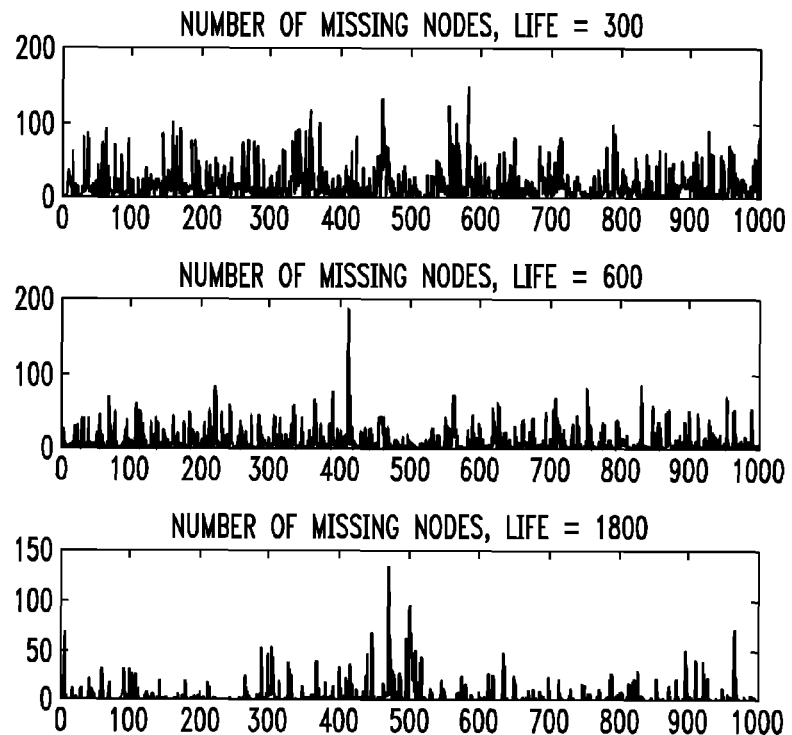
FIG. 9 is series of graph illustrating a number of missing nodes for a maintained tree, according to an embodiment of the present invention.

Although covering more than 99% of the live nodes seems to be fairly impressive, FIG. 9 shows that aggregation on maintained tree can in fact miss large number of live nodes. In the figure, the x-axis is the aggregation number, and the y-axis is the number of live nodes missing from that aggregation. The figure shows that even for an average life time of 1800 seconds, one aggregation can miss more than 50 live nodes from time to time, and the maximum number of missing nodes in one aggregation is 138, which is clearly not reliable.

Note in order to detect latent failures as quickly as possible, a small heartbeat interval of 1 second is used. However, even with such frequent heartbeat messages, the results show that aggregation on a maintained tree cannot achieve high reliability.

Figure 10:
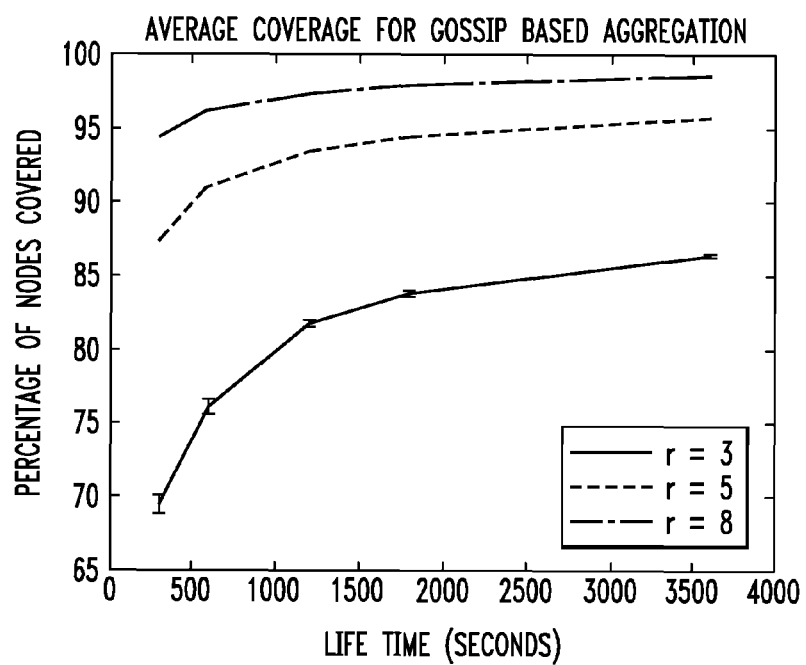
FIG. 10 is a graph illustrating reliability of aggregation on gossip membership, according to an embodiment of the present invention.

FIG. 10 shows the reliability of aggregation on gossip membership is not good either. For example, even for a redundancy level of r=8 and life time of 3600 seconds, aggregation on gossip can only cover about 98.6% of the nodes. The reason is that gossip is entirely unstructured. Therefore, high reliability can only be achieved through very high level of message redundancy.

Figure 11:
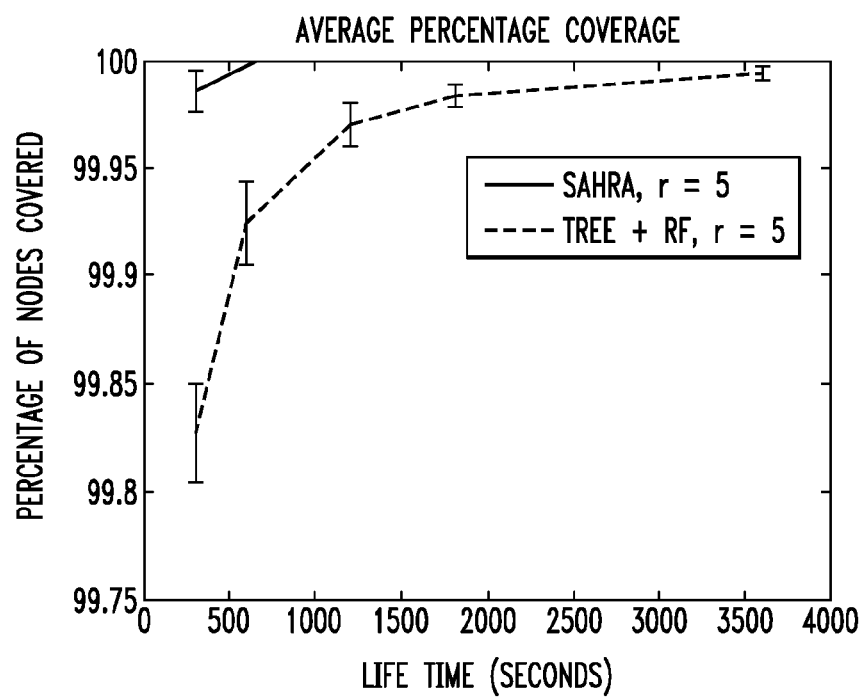
FIG. 11 is a graph illustrating average coverage and 95% confidence interval for aggregation using SAHRA and Tree+RF, according to an embodiment of the present invention.

FIG. 11 shows the average coverage and 95% confidence interval for aggregation using SAHRA and Tree+RF. SAHRA is built on top of a group tree, and Tree+RF uses both a maintained tree and gossip protocol for membership management. The redundancy level is 5. SAHRA achieves almost 100% coverage for life time $\geq 1200$. Tree+RF also achieves more than 99% coverage. However, it is not as good as SAHRA. For example, when life time is 1200 s, SAHRA missed only one node for the 1000 aggregations, while Tree+RF missed a total of 161 nodes, with one aggregation missing as many as 24 nodes.

Figure 12:
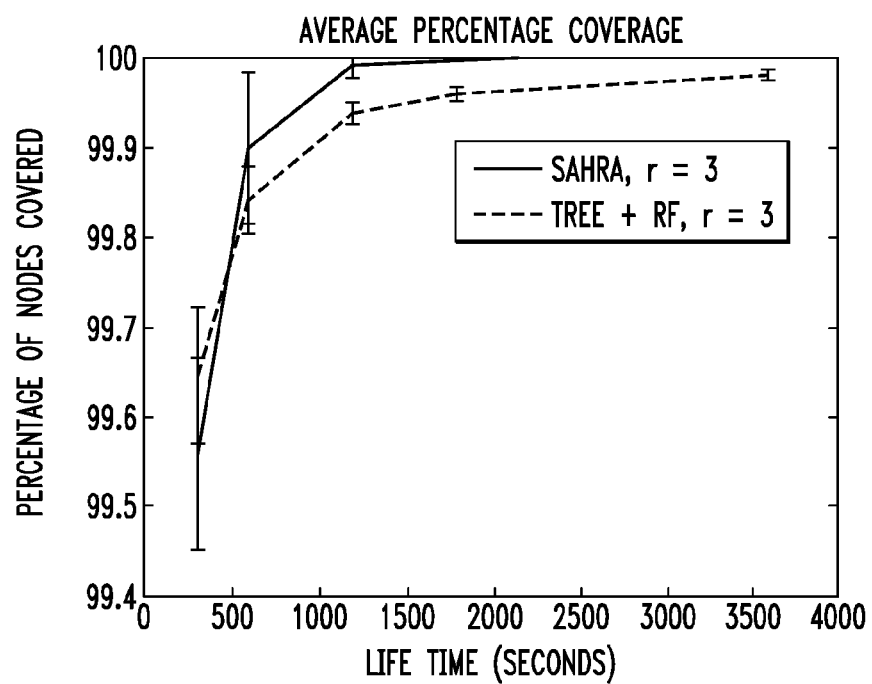
FIG. 12 is a graph illustrating average coverage and 95% confidence interval for SAHRA and Tree+RF with a redundancy of 3, according to an embodiment of the present invention.

FIG. 12 shows the coverage for SAHRA and Tree+RF when the redundancy level is 3. For life time $\geq 1200$, SAHRA still performs better than Tree+RF. However, when life time is 300, the coverage of SAHRA is smaller than Tree+RF. Also, the confidence interval is wide for SAHRA when life time is $\leq 600$, indicating occasional missing of large number of nodes.

These results show some interesting characteristics of the group tree. Since SAHRA propagates aggregation request from level to level on the group tree, if the churn rate is too high and the redundancy level too low, the propagation from parent group to child group might stop at some level (despite the coordinated and age aware child selection). At this time, a whole "subtree" of groups will be missing from the aggregation. Thus, in order to achieve high reliability, the redundancy level should not be too low.

Figure 13:
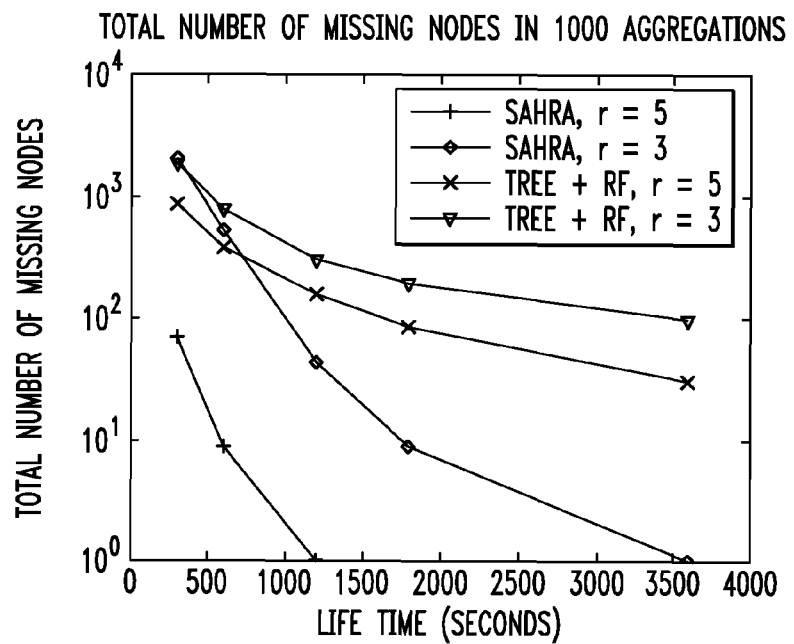
FIG. 13 is a graph illustrating total number of missing nodes in 1000 aggregations, according to an embodiment of the present invention.

FIG. 13 shows the total number of live nodes missing from the experiments. The y-axis is in log scale. With redundancy r=5, SAHRA consistently outperforms Tree+RF by an order of magnitude. For r=3, SAHRA achieves the same performance when life time is $\geq 1200$. Note for r=5 and life time $\geq 1800$, the total number of missing nodes for SAHRA is 0, thus, cannot be shown in the log scale.

Figure 14:
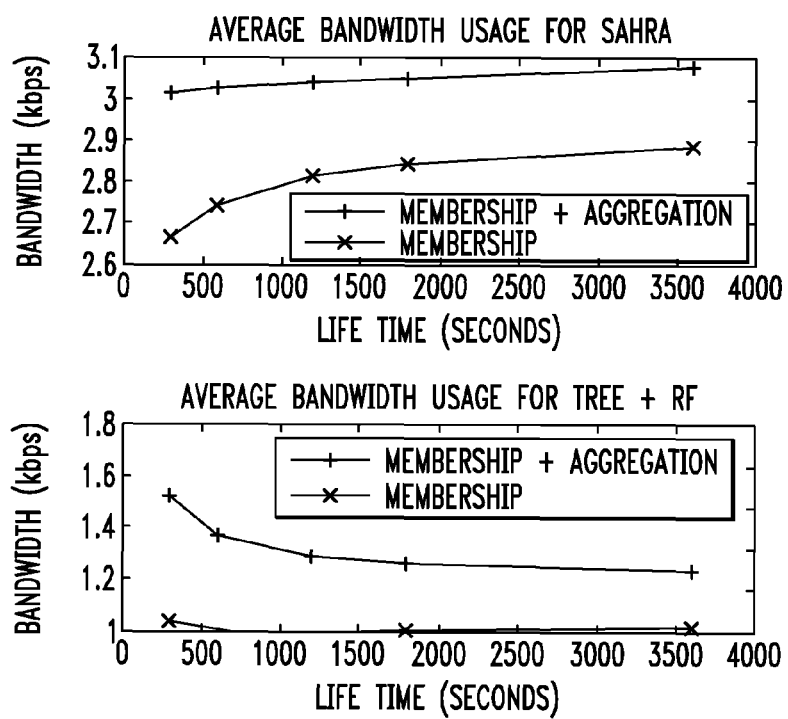
FIG. 14 is a graph illustrating per node bandwidth usage of SAHRA and Tree+RF, according to an embodiment of the present invention.
Figure 15:
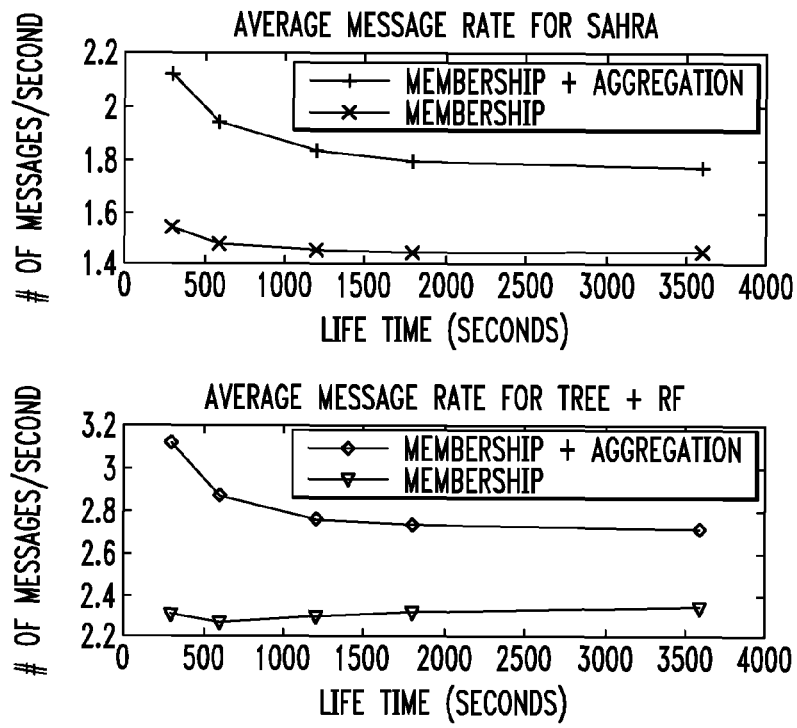
FIG. 15 is a graph illustrating per node message rate of SAHRA and Tree+RF, according to an embodiment of the present invention.

FIGS. 14 and 15 show the per node overhead of SAHRA and Tree+RF, for both the membership alone and for the whole aggregation system. FIG. 14 shows that SAHRA consumes more bandwidth than Tree+RF. This is mainly due to the group tree maintenance protocol includes membership information in most of its messages. As a result, the message sizes are larger than just a heartbeat. Since enterprise is considered, it is believed to be worthwhile to consume less than 3 kbps for maintenance traffic in return for very high reliability in aggregation.

FIG. 14 shows that the bandwidth usage for group tree increases slightly when the life time increases. This is because when the average life time is small, the membership entries contain more dead nodes. When a node gossips with such nodes, there will be no reply messages. The figure also shows the aggregation layer consumes more bandwidth when life time is small. This is consistent with the intuition since there are more retransmissions during request propagation when the churn rate is high. The same trend is seen in FIG. 15.

FIG. 15 shows that in terms of number of messages, Tree+RF has a larger overhead than SAHRA. This is because the membership layer of Tree+RF sends frequent heartbeat messages to maintain the membership tree. Despite such high maintenance frequency, SAHRA can achieve much better reliability in most cases.

Figure 16:
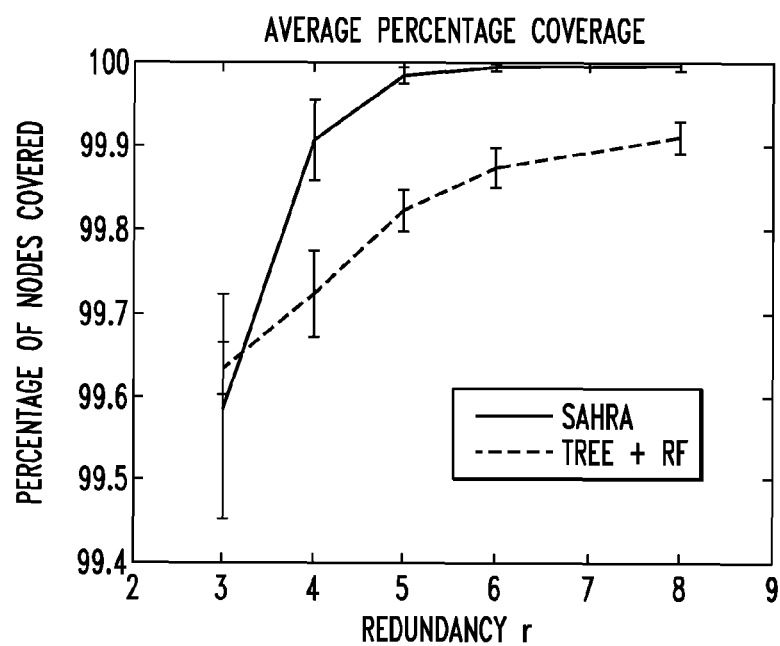
FIG. 16 is a graph illustrating average coverage and 95% confidence interval for different redundancy level, according to an embodiment of the present invention.

Our previous results show that for a high churn rate (life time=300 s), SAHRA does not perform well with redundancy of 3. Therefore, it is interesting to see if high reliability can be achieved using higher level of redundancy. FIG. 16 shows the coverage of SAHRA and Tree+RF for different redundancy level. The average life time is 300 seconds. The figure shows that SAHRA can indeed use higher redundancy to achieve high reliability. For r=8, SAHRA missed a total of 16 nodes for 1000 aggregations, while Tree+RF missed 453 nodes.

Figure 17:
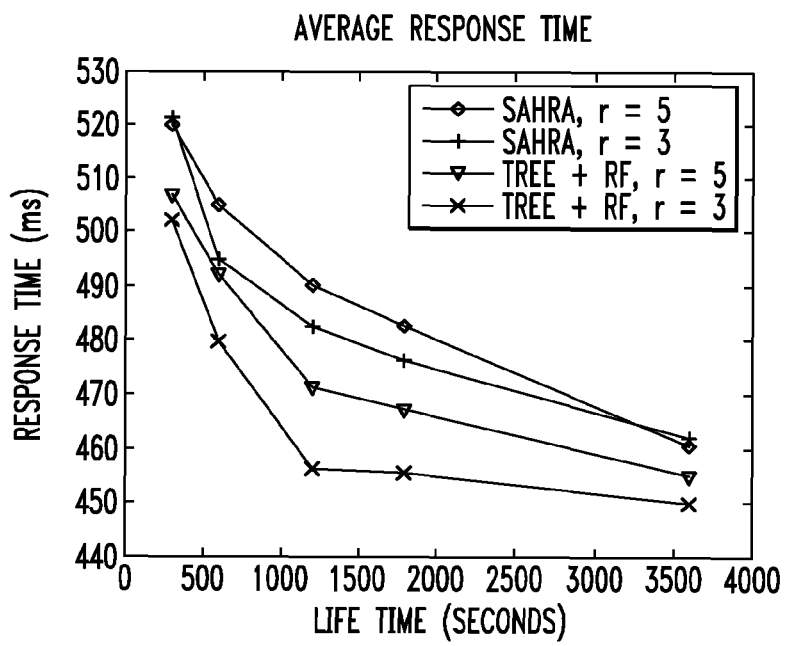
FIG. 17 is a graph illustrating average response time, according to an embodiment of the present invention.

FIG. 17 shows the response time of SAHRA and Tree+RF. Response time is the time between the initiation of an aggregation and its completion. FIG. 17 shows that when churn rate decreases, the average response time will decrease, since it is less likely that the aggregation request is propagated to a dead node, which would lead to costly timeouts. The figure also shows that the response time of SAHRA is larger than Tree+RF. The reason is that the request propagation for SAHRA has to follow the group tree structure, which is not locality aware. However, the difference is within 10% of each other.

Our previous results have examined the performance of different membership schemes and the effect of forward path redundancy. Return path failure is caused by some nodes that fail during the aggregation. When the aggregation response time is small, return path failures are unlikely to happen. However, when the network delay is large or the local execution of the aggregation request is time consuming (e.g., search through a large log file), there will be a non-trivial probability of having return path failures.

Figure 18:
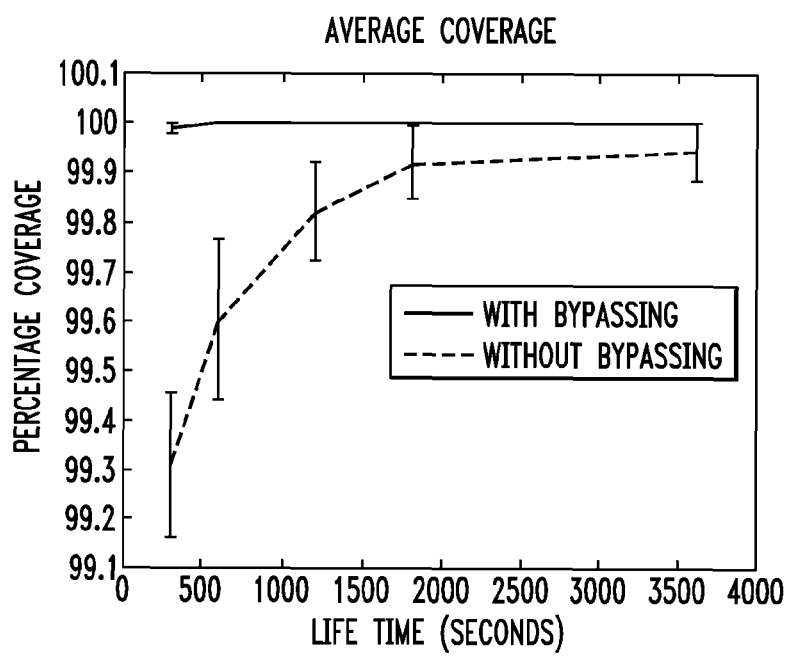
FIG. 18 is a graph illustrating the effect of child failure bypassing, according to an embodiment of the present invention.

FIG. 18 shows the coverage of SAHRA for different churn rate, with and without child failure bypassing. The redundancy level is 5, and the network delay is scaled so that the mean and max delay between two nodes are 51 ms and 180 ms, respectively. The figure shows that when aggregation takes longer time, having child failure bypassing can indeed significantly improve the aggregation reliability. Not only is the average coverage higher, but also the 95% confidence interval is narrower, indicating it is less likely to have large number of missing nodes.

To test the performance of SAHRA in a more realistic environment, experiments have also been conducted with SAHRA on the PlanetLab (See, for example, L. Peterson et al., "A Blueprint for Introducing Disruptive Technology Into the Internet," 1st Workshop on Hot Topics in Networks (Hot-Nets-1), Princeton, N.J., October 2002) using the same implementation as the simulations. SAHRA is targeted for enterprise environment, as a result, the experiments on PlanetLab is inevitably limited. For example, SAHRA currently does not support locality awareness, therefore it is not suited for a wide area environment. Also, non-transitive network connectivity (See, for example, M. Freedman et al., "Non-transitive Connectivity and DHTs," USENIX WORLDS '05, December 2005) is a phenomenon not rare on PlanetLab, which the current group tree protocol cannot handle. For these reasons, only 71 North America nodes that belong to universities have been selected. On each node 5 instances are deployed, with a total of 355 instances.

Figure 19:
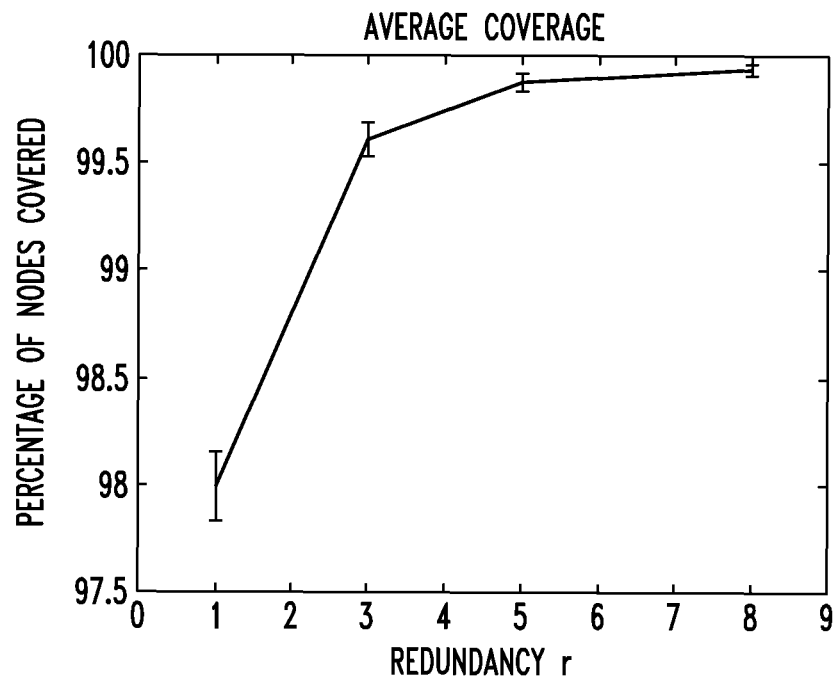
FIG. 19 is a diagram illustrating average coverage and 95% confidence interval on PlanetLab, according to an embodiment of the present invention.

In the first set of experiments, churn was not introduced. Each time 100 aggregations are run (one aggregation every 20 seconds) on the 355 instances using different degree of redundancy. FIG. 19 shows the average coverage and 95% confidence interval. When r=1, the coverage is only about 98%. However, when r increases to 3, the coverage improves to more than 99.6%. When r=5, the coverage is about 99.88%. On the one hand, these results are clearly not as good as the simulation results. On the other hand, it is known many node pairs on PlanetLab have connectivity problems such as high loss rate. In order to assess the impact of such problems, a simple experiment is performed that uses ping to test the all pairs loss rate between these nodes. Out of the roughly 4900 node pairs, there are about 80 pairs with a loss rate $\geq 20\%$, and 50 pairs with loss rate $\geq 40\%$. Even though these are just a small fraction of the available overlay links, if they are selected for request propagation, they will probably cause timeouts. Therefore, the existence of such high loss rate overlay links is believed to be the reason why the performance of SAHRA on PlanetLab is not as good as in simulations.

In the second set of experiments, 100 aggregations are run using the same deployment. However, each time some instances are first randomly killed just before the aggregation. This is meant to examine the ability of group tree for tolerating failure entries. The redundancy level is r=3, and the number of instances killed is 3, 5 and 10.

Figure 20:
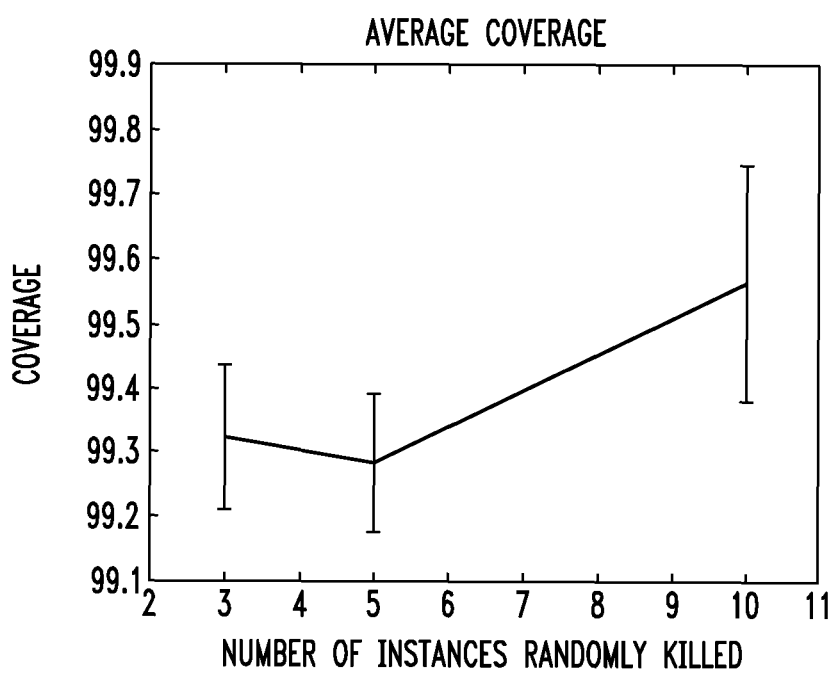
FIG. 20 is a diagram illustrating average coverage and 95% confidence interval on PlanetLab with manually introduced churn, according to an embodiment of the present invention.

FIG. 20 shows the coverage of aggregation with churn. Randomly killing some instances does not significantly affect the performance of SAHRA. For different number of instances killed, the coverage is close to the case in the first set of experiments. The figure shows that killing 10 instances achieves a higher coverage than killing only 3 or 5 instances. This might have been due to the dynamic changes on the PlanetLab since the first set of experiments were performed concurrently, but this set sequentially (because each experiment requires killing different number of instances, thus, different experiments cannot be done at the same time).

Data aggregation is a fundamental building block in large scale distributed system management. Much previous work (See, for example, G. Khanna et al., "Application Performance Management in Virtualized Server Environments," In NOMS 2006, Vancouver, Canada, April 2006; P. Yalagandula et al., "A Scalable Distributed Information Management System," In ACM SIGCOMM 2004, August 2004, and M. Jelasity et al., "Gossip-Based Aggregation in Large Dynamic Networks," ACM Transactions on Computer Systems 21, 3, August 2005, 219-252) has investigated the problem in different aspects. Astrolabe (See, for example, G. Khanna et al., "Application Performance Management in Virtualized Server Environments," NOMS 2006, Vancouver, Canada, April 2006) has focused on the scalability of distributed aggregation. Astrolabe builds a tree structure for hierarchical aggregation, and uses gossip protocols for aggregates update. SDIMS (See, for example, P. Yalagandula et al., "A Scalable Distributed Information Management System," In ACM SIGCOMM 2004, August 2004) builds multiple aggregation tree on top of distributed hashtable. Thus, it is scalable in the number of attributes as well as the number of nodes. Jelasity et al. have considered adaptive and robust aggregation using gossip protocols. However, these systems have not considered reliability of distributed aggregation in an enterprise environment.

Much work on aggregation has been done in the domain of wireless sensor networks (See for example, M. Kwon et al., "Topology-Aware Overlay Networks for Group Communication," NOSSDAV 2001, May 2002, and C. Intanagonwiwat et al., "Directed Diffusion: A Scalable and Robust Communication Paradigm for Sensor Networks," MobiCom '00, 2000). For example, TAG considers aggregate queries that are expressed in declarative languages, and discusses how to optimize these queries in a sensor network environment. Direct diffusion aggregates data from a sensor network by pushing the sensing task into the network. Data items that match the task are "drawn" toward the task originator along multiple paths. In both systems, energy is a significant factor in their system design.

Several overlays have been discussed as being used for membership management. In theory, any structured (See, for example, I. Stoica et al., "Chord: A Scalable Peer-to-Peer Lookup Service for Internet Applications," In Proceedings of ACM SIGCOMM '01 (2001), and A. Rowstron et al., "Pastry: Scalable, Decentralized Object Location and Routing for Large-Scale Peer-to-Peer Systems," In Middleware 2001, November 2001, or unstructured [The Gnutella Protocol 0.4 http://www9.limewire.com/developer//gnutella_protocol 0.4. pdf and KaZaA Homepage. http://www.kaaza.com/] overlays can be used for membership management. However, unstructured overlays lack global structure, thus, similar to gossip based membership, high reliability can only be achieved with high redundancy, even when the system has no failures. Structured overlays provide both redundancy and global structure, thus, they might be used for membership management. However, using existing structured overlays (i.e., DHTs) for membership management might be an overkill since they provide more functionality than what a membership layer needs. For example, consistent routing (See, for example, M. Castro et al., "Performance and Dependability of Structured Peer-to-Peer Overlays," DSN '04, June 2004) is an important property that many DHTs provide, which basically means different nodes should agree on which one is currently responsible for a given key. Such property is critical for many applications such as storage, but not for membership.

The problem of reliable data aggregation has been studied, which is a basic building block for many enterprise management systems. The key factors that affect the reliability of data aggregation in a highly dynamic environment have been identified, and two key techniques to improve reliability have been proposed: forward path redundancy and child failure bypassing. To better support forward path redundancy, a new membership layer called group tree has been designed, which organizes nodes into a rough tree structure where each tree vertex consists of a group of nodes. Nodes within a group provides natural redundancy to each other, and the tree structure over node groups facilitates high reliability with low message overhead. A reliable data aggregation system has been designed on top of the group tree. Through extensive simulations and experiments on the PlanetLab, it is demonstrated that the system can indeed achieve high reliability for distributed data aggregation in a highly dynamic environment.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method of managing membership of a network of nodes, comprising the steps of:
    organizing nodes of the network into a tree structure having a plurality of vertices, wherein each vertex of the tree structure comprises a group having a plurality of nodes; and
    maintaining membership information at each node, wherein the membership information for a given node comprises information about a group to which the given node belongs and child groups of the group to which the given node belongs in the tree structure;
    wherein the steps are performed at least in part by a processor.

2. The method of claim 1, wherein the step of organizing nodes of the network comprises the step of assigning an id to each group in accordance with a level within the tree structure and a sequence of groups on the level of the tree structure.

3. The method of claim 1, wherein the step of organizing nodes of the network comprises the step of maintaining a size of each group at a target size.

4. The method of claim 3, wherein the step of maintaining a size of each group comprises the step of recruiting nodes from a child group of the given group if the given group is below the target size and the given group has at least one child group.

5. The method of claim 3, wherein the step of maintaining a size of each group comprises the step of migrating nodes of the given group down from the given group to a child group of the given group if the given group is above the target size.

6. The method of claim 3, further comprising the step of joining a node to the network of nodes, wherein the step of joining a node comprises the steps of:
    sending a join request to one or more known nodes in the network;
    checking size of each group of the one or more known nodes; and
    accepting the join request at a given group having a given known node if a size of the given group is smaller than the target size.

7. The method of claim 1, wherein the step of maintaining membership information comprises the step of removing information about the given node from other nodes that are members of the group to which the given node belongs when the given node has stopped responding to messages for a specified period of time.

8. The method of claim 1, wherein the step of organizing nodes of the network comprises the steps of:
    assigning a random id to each node of each group; and
    organizing nodes in each group in a ring in accordance with the random id of each node.

9. The method of claim 1, further comprising the step of detecting a failure of a node in the network.

10. The method of claim 9, wherein the step of detecting a failure comprises the step of:
    periodically sending a message from each node to a neighbor of each node for failure detection; and
    if the given node is unresponsive to a defined number of messages, reporting a node failure to other nodes in the group to which the given node belongs.

11. The method of claim 10, wherein, in the step of periodically sending a message from each node, the nodes of a group are organized in a ring and the message is sent to a right neighbor of each node.

12. The method of claim 1, wherein the step of maintaining membership information at each node comprises the step of maintaining an age at each node for every other node in the same group.

13. The method of claim 12, wherein, in the step of maintaining an age, the age of a node comprises a time period from which it was last known that the node was live.

14. The method of claim 1, wherein the step of maintaining membership information at each node comprises the step of exchanging membership information with other nodes.

15. The method of claim 14, wherein the step of exchanging membership information comprises at least one of:
    periodically sending a message from each node to a neighbor of each node;
    selecting a random member from the group to which the given node belongs for membership exchange with the given node; and
    selecting a random member from a child group of the group to which the given node belongs for membership exchange with the given node.

16. The method of claim 1, further comprising the step of performing data aggregation on the network of nodes.

17. The method of claim 16, wherein the step of performing data aggregation comprises the steps of:
    randomly selecting a plurality of nodes in a root group of the tree structure;
    propagating an aggregation request to the plurality of nodes;
    selecting a random node in each child group of the root group by each of the plurality of nodes;
    propagating the aggregation request to the random nodes in each child group;
    propagating the aggregation request to each node in the root group from each of the plurality of nodes.

18. The method of claim 17, wherein the steps of selecting a random node in each child group, propagating the aggregation request to the random nodes in each child group, and propagating the aggregation request to each node in the root group are repeated until there are no child groups left, wherein random nodes in each child group in a previous iteration become the plurality of nodes in a current iteration.

19. The method of claim 17, wherein the step of selecting a random node in each child group comprises the steps of:
    dividing nodes of each child group into segments based on node id;
    selecting a segment based on rank of nodes in the root group, by each of the plurality of nodes; and
    selecting a node from the selected segment in the child group by each of the plurality of nodes.

20. The method of claim 19, wherein the step of selecting a node from the selected segment, comprises the step of selecting the node from the selected segment with the smallest age.

21. Apparatus for managing membership of a network of nodes, comprising:
    a memory; and
    at least one processor coupled to the memory and operative to: (i) organize nodes of the network into a tree structure having a plurality of vertices, wherein each vertex of the tree structure comprises a group having a plurality of nodes; and (ii) maintain membership information at each node, wherein the membership information for a given node comprises information about a group to which the given node belongs and child groups of the group to which the given node belongs in the tree structure.

22. A method for making a computer implemented process to managing membership of a network of nodes, the method comprising the steps of:

instantiating first computer instructions onto a non-transitory computer readable medium, the first computer instructions configured to organize nodes of the network into a tree structure having a plurality of vertices, wherein each vertex of the tree structure comprises a group having a plurality of nodes; and instantiating second computer instructions onto a non-transitory computer readable medium, the second computer instructions configured to maintain membership information at each node, wherein the membership information for a given node comprises information about a group to which the given node belongs and child groups of the group to which the given node belongs in the tree structure.

* * * * *